US008760781B2

(12) United States Patent
Johnson et al.

(10) Patent No.: US 8,760,781 B2
(45) Date of Patent: Jun. 24, 2014

(54) SYSTEM UTILITY FOR CONTROLING DATA SYNCHRONIZATION IN A TAPE DATA STORAGE SYSTEM

(75) Inventors: Gavin S. Johnson, San Jose, CA (US); Jon A. Lynds, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/465,176

(22) Filed: May 7, 2012

(65) Prior Publication Data

US 2013/0293978 A1    Nov. 7, 2013

(51) Int. Cl.
  *G11B 27/36*    (2006.01)
(52) U.S. Cl.
  USPC .............................................. 360/31; 360/55
(58) Field of Classification Search
  None
  See application file for complete search history.

(56) References Cited

U.S. PATENT DOCUMENTS

| | | | |
|---|---|---|---|
| 4,428,064 A | 1/1984 | Hempy et al. | |
| 5,327,535 A * | 7/1994 | Ogata et al. | 711/113 |
| 5,525,902 A * | 6/1996 | Nakajima et al. | 360/72.1 |
| 5,576,903 A * | 11/1996 | Brown et al. | 360/48 |
| 6,049,848 A | 4/2000 | Yates et al. | |
| 6,111,708 A * | 8/2000 | Jewell et al. | 360/31 |
| 6,711,580 B2 | 3/2004 | Dahman et al. | |
| 6,870,699 B1 | 3/2005 | Mikkelsen et al. | |
| 7,020,742 B2 | 3/2006 | Beeston et al. | |
| 7,266,636 B2 | 9/2007 | Jaquette | |
| 7,385,776 B2 | 6/2008 | Atagaki et al. | |
| 7,463,440 B2 | 12/2008 | Mikkelsen et al. | |
| 2001/0055467 A1* | 12/2001 | Nakatani et al. | 386/46 |
| 2006/0041781 A1* | 2/2006 | Edling et al. | 711/111 |
| 2007/0177293 A1* | 8/2007 | Itagaki | 360/53 |
| 2008/0266699 A1* | 10/2008 | Masuda et al. | 360/69 |
| 2010/0079889 A1* | 4/2010 | Leopold et al. | 360/31 |
| 2010/0241770 A1 | 9/2010 | Tumblin et al. | |
| 2010/0257437 A1* | 10/2010 | Hwang et al. | 714/819 |

* cited by examiner

*Primary Examiner* — Thang Tran
(74) *Attorney, Agent, or Firm* — David W. Victor; Konrad, Raynes, Davda and Victor LLP (57) ABSTRACT

A computer-implemented method, apparatus and computer-program product for writing data to a tape data storage medium. The method comprises providing a system service that an application invokes to handle data synchronization events associated with writing a group of files to the tape medium; keeping track of the files and data blocks in each file while writing the files to the tape medium based on file boundaries; and responsive to a data writing failure, invoking the system service to determine the files affected by the data writing failure.

20 Claims, 6 Drawing Sheets

SYSTEM UTILITY FOR CONTROLING DATA SYNCHRONIZATION IN A TAPE DATA STORAGE SYSTEM

FIELD OF THE INVENTION

The invention relates generally to data storage systems, and more particularly, to a system service utility for controlling data synchronization in a tape data storage system.

BACKGROUND

Tape data storage systems continue to be the systems of choice for backing up large amount of persistent data in enterprise data centers due to their relatively low cost. Examples of common tape drive systems include the IBM System Storage TS1130 Tape Drive products offered by International Business Machines corporation of Armonk, N.Y.

A tape drive system typically records data onto a magnetic tape medium enclosed in a tape cartridge and later retrieves the recorded data using a magnetic sensor commonly referred to as a magnetic tape head. In writing data files to a magnetic tape medium, a tape drive system periodically performs data synchronizations to ensure that related data in a hardware cache is written to the medium. A data synchronization may result from a "Write Tape Mark" channel command or writing a tape mark that separates two data files (or groups of data blocks) in a sequence.

Data synchronization can have a significant impact on tape drive performance. After a data synchronization has occurred, tape drive movement comes to a halt. When more data needs to be written to the medium, the drive must regain servo track acquisition. This typically involves some backward motion which gives the drive sufficient time and distance to achieve recording speed. This backward motion and reacquisition of servo tracks can take up a significant amount of time relative to the normal recording data rate. The impact of the data synchronization increases inversely with the size of the files being written. That is, with small files, there are more tape marks written relative to the actual data being written.

In addition to performance impact, it is difficult to determine a data recovery point when multiple files are embedded in a single physical tape file and data synchronization fails while the files are being written to a tape medium from the cache.

It is desirable to have a utility for controlling data synchronization events and determining affected files in synchronization failure in a tape storage system.

BRIEF SUMMARY

Exemplary embodiments of the invention relate to handling data synchronization events in a tape storage system. The embodiments of the invention may be implemented as a system service utility that is invoked by an application to control data synchronization events, determine the specific compromised files in the event of a synchronization failure, and assist with data file auditing.

One aspect of the invention concerns a computer-implemented method of writing data to a storage medium. The method may comprise providing a system service that an application invokes to handle data synchronization events associated with writing a group of files to the storage medium, keeping track of the files and data blocks in each file while writing the files to the medium; and responsive to a data writing failure, invoking the system service to determine the files affected by the data writing failure. of protecting content in a media.

Another aspect of the invention concerns a system for protecting content in a media. The system comprises a processor, at least one tape drive for recording data on a tape medium, and a service utility executed by the processor and invoked by an application for handling data synchronization events associated with writing a group of files to the tape medium. The system service keeps track of the files and data blocks in each file while writing the files to the tape medium based on file boundaries, and in response to a data writing failure, determines the files affected by the data writing failure.

A further aspect of the invention concerns a computer program product for protecting content in a media. The computer program product comprises a computer readable storage medium readable by a computer and embodying program instructions executable by the computer to provide a system service that an application invokes to handle data synchronization events associated with writing a group of files to the tape medium; keep track of the files and data blocks in each file while writing the files to the tape medium based on file boundaries; and responsive to a data writing failure, determine the files affected by the data writing failure.

The details of the preferred embodiments of the invention, both as to its structure and operation, are described below in the Detailed Description section in reference to the accompanying drawings. The Summary is intended to identify key features of the claimed subject matter, but it is not intended to be used to limit the scope of the claimed subject matter.

DETAILED DESCRIPTION

The invention is described in exemplary embodiments in the following description with reference to the Figures, in which like numbers represent the same or similar elements. While the invention is described through the embodiments for achieving the invention's objectives, it will be appreciated by those skilled in the art that variations may be accomplished in view of these teachings without deviating from the spirit or scope of the invention.

The invention relates to a computer-implemented method, system, and computer program product for providing a system service that may be invoked by an application to handle data synchronization events associated with data files stored on a data storage tape medium. The application may be running on a host computer coupled to a magnetic tape data library through a data storage control system.

Magnetic tape provides a means for physically storing data which may be archived or which may be stored in storage shelves of automated data storage libraries and accessed when required. A data storage tape library may comprise a number of tape drives for reading and writing data on magnetic tape media, such as single-reel or two-reel magnetic tape cartridges. An example tape library products is the TS3500™ Tape Library offered by IBM Corporation.

Figure 1:
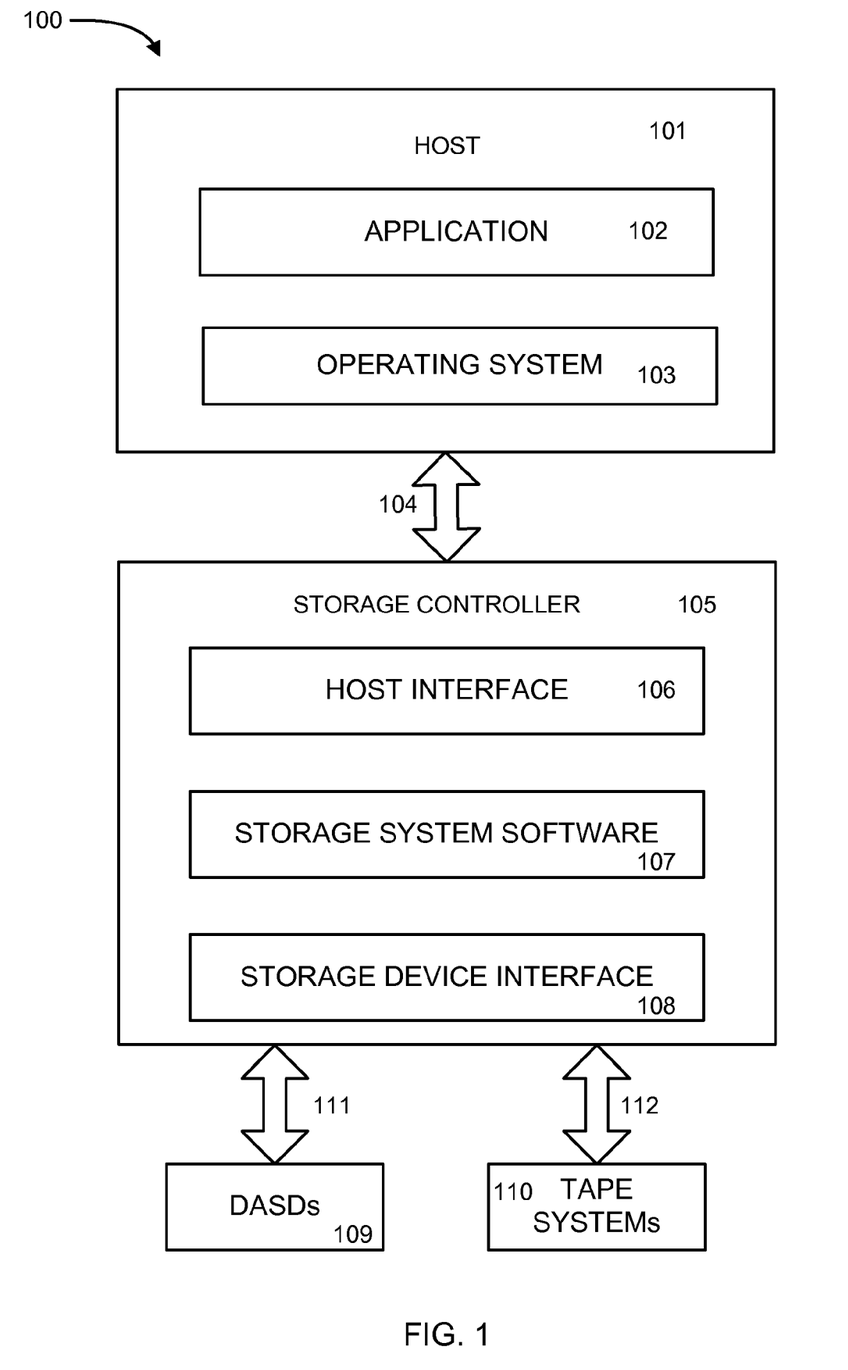
FIG. 1 is a block diagram of a computer configuration that includes a host system, a storage controller, and data storage devices in which embodiments of the invention may be provided.

FIG. 1 is a block diagram showing an example computer configuration 100 comprising a host system, a storage control system, and data storage devices in which aspects of the invention may be implemented. The computer configuration 100 includes a host system 101 in which an operating system 103 manages the operation of the host 101 and its interactions with hardware and software components that are connected to the host system 101. One or more applications 102 may be running in the host system 101 to provide services and data to users of the computer configuration 100 and applications running on the host system 101.

Host system 101 may be coupled to a storage controller 105 through host connection 104. The host connection 104 allows data and control information to be transferred at a high speed between the host system 101 and the storage controller 105. Embodiments of the host connection 104 may be include, for example, Fibre Channel (FC), Enterprise Systems Connection (ESCON), Small Computer Systems Interface (SCSI), Internet SCSI (iSCSI), and Serial Storage Architecture (SSA).

The storage controller 105 may include a host interface logic 106 for managing, processing, and communicating data to and from the host system 101. Host interface logic 106 may be implemented in the form of a host channel. The storage controller 105 may include device interface logic 108 for managing, processing, and communicating data to and from one or more data storage devices 109-110. The operation of the storage controller 105 and management of data storage may be performed by storage system software 107.

The storage controller 105 may communicate with the data storage devices 109-110 through device connections 111-112. Examples of data storage devices 109-110 include direct access storage devices (DASDs) 109 and magnetic tape systems 110. Device connections 111-112 may comprise device adapters.

Figure 2:
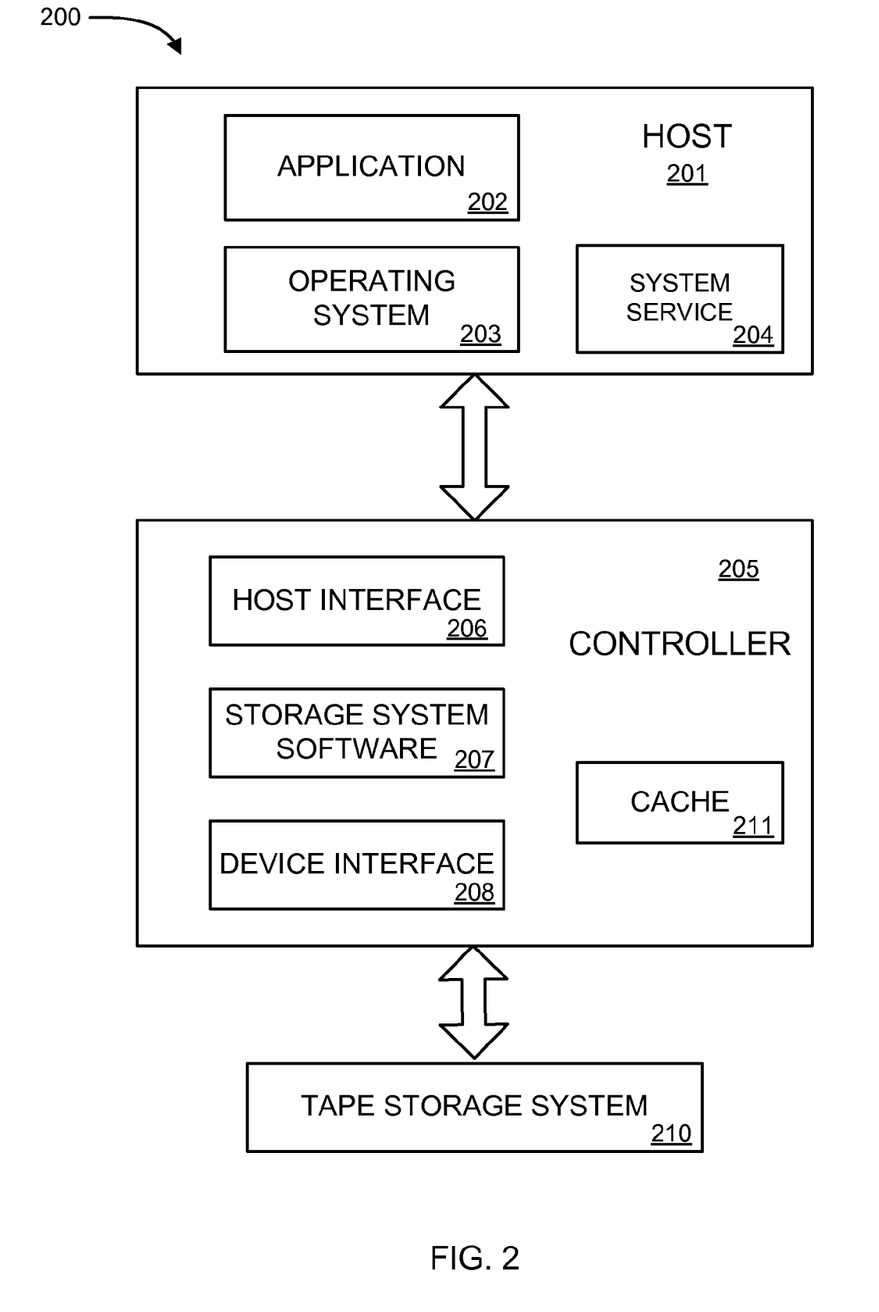
FIG. 2 is a block diagram showing example functional components in an tape storage configuration for providing embodiments of the invention.

FIG. 2 is a block diagram showing example functional components in an tape storage configuration 200 for providing embodiments of the invention. In addition to operating system 203 for managing the operation of host system 201 and applications running on the host 201, e.g., application 202, a system service 204 may be running on the host 201 to handle data synchronization when files are written to a tape storage medium. In one embodiment, system service 204 may be implemented as a program (e.g., a macro) that is invoked by application 202. In another embodiment, the system service 204 may reside in storage controller 205 that is coupled to host system 201, as described with reference to FIG. 1

Controller 205 communicates with host 201 through host interface 206 and tape storage system 210 respectively through host interface 206 and device interface 208, as previously described. An example of the tape storage system 210 is the Tape Drive product model TS1130 provided by International Business Machines corporation of Armonk, N.Y.

In managing the operation of storage controller 205, storage system software 207 temporarily stores data to be written to and read from tape storage system 210 in a cache storage 211. Cache 211 is a memory in which data to be written to and read from the tape system 210 is accumulated. For example, the cache 211 is configured of a dynamic random access memory (DRAM). Cache 211 may comprise of multiple segments where each segment stores a data set, which may be a unit of data read from and written to the tape system 210.

Figure 3:
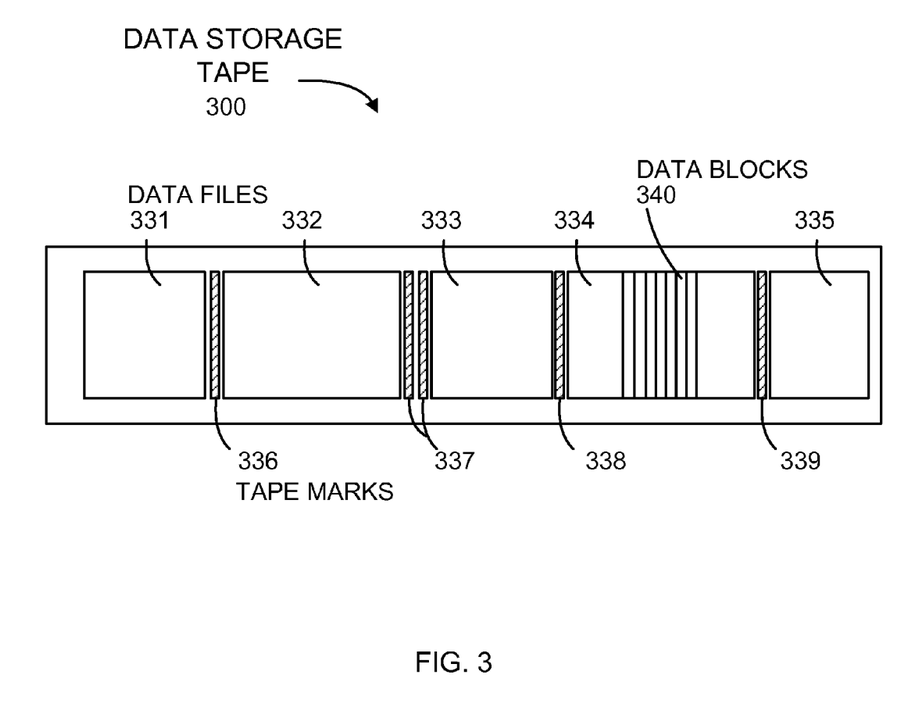
FIG. 3 illustrates a tape medium on which data files may be stored and embodiments of the invention may be used to handle data synchronization events associated with the data files.

FIG. 3 illustrates a tape medium on which data files may be stored and embodiments of the invention may be used to handle synchronization events associated with the data files. Tape 300 is shown as storing data files 331-335. Each of the data files 331-335 includes multiple data blocks 340. Adjacent data files 331 and 332 are separated by one or more tape marks 336. Similarly, adjacent data files 332 through 335 are respectively separated by one or more tape marks 337 through 339. The read-write head 214 uses the tape marks 336-339 to detect the start and end points of data files 331-335.

A tape mark 336-339 follows each data file 331-335 and data file label group. When a program writes data on a standard labeled or unlabeled tape 300, the system automatically reads and writes labels and tape marks 336-339. Two tape marks follow the last trailer label group on a standard-label volume. On an unlabeled volume, the two tape marks appear after the last data file.

When a program writes data on a nonstandard labeled tape 300, the installation supplies routines to process labels and tape marks 336-339 and to position the tape 300. For the system to retrieve a data file, the installation routine that creates nonstandard labels must write tape marks 336-339. Otherwise, tape marks 336-339 are not required after nonstandard labels because installation routines manage positioning of the tape volumes.

A Write Tape Mark Channel Command results in a Synchronize that ensures that all related data in the hardware cache is written to the tape medium. This is referred to as an "implicit" synchronize. An implicit synchronize can occur for a number of reasons: when tape marks 336-339 are written, when the drive transitions from writing to reading, when the direction of tape motion is changed, etc. Synchronization also occurs when a Synchronize Channel Command is sent to the tape drive 200. This is referred to as an "explicit" synchronize.

Data still in the cache 211 but has not been stored on the final recording medium is referred to as data that is not synchronized. Data synchronization is the process by which the system ensures that data previously given to the system 200 via WRITE, PUT, and PUTX macros is written to the storage medium 220.

A storage system may provide a macro, such as SYNCDEV, for data synchronization. The SYNCDEV macro suspends a program until contents in a control unit cache have been written to a tape medium. This synchronizes the program's data and the data on the tape medium. The system checks the data to insure no data loss and that all the data is written out to storage.

The system automatically synchronizes the data when going to a new volume or when the data set is closed. However, the use of SYNCDEV may degrade performance of the data storage system 200.

For a magnetic tape cartridge device, the SYNCDEV macro may be invoked to:

Request information regarding synchronization, or

Demand that synchronization occur based on a specified number of data blocks that are allowed to be buffered. If zero is specified, synchronization will always occur.

When SYNCDEV completes successfully, a value is returned that shows the number of data blocks remaining in the control unit buffer.

Figure 4:
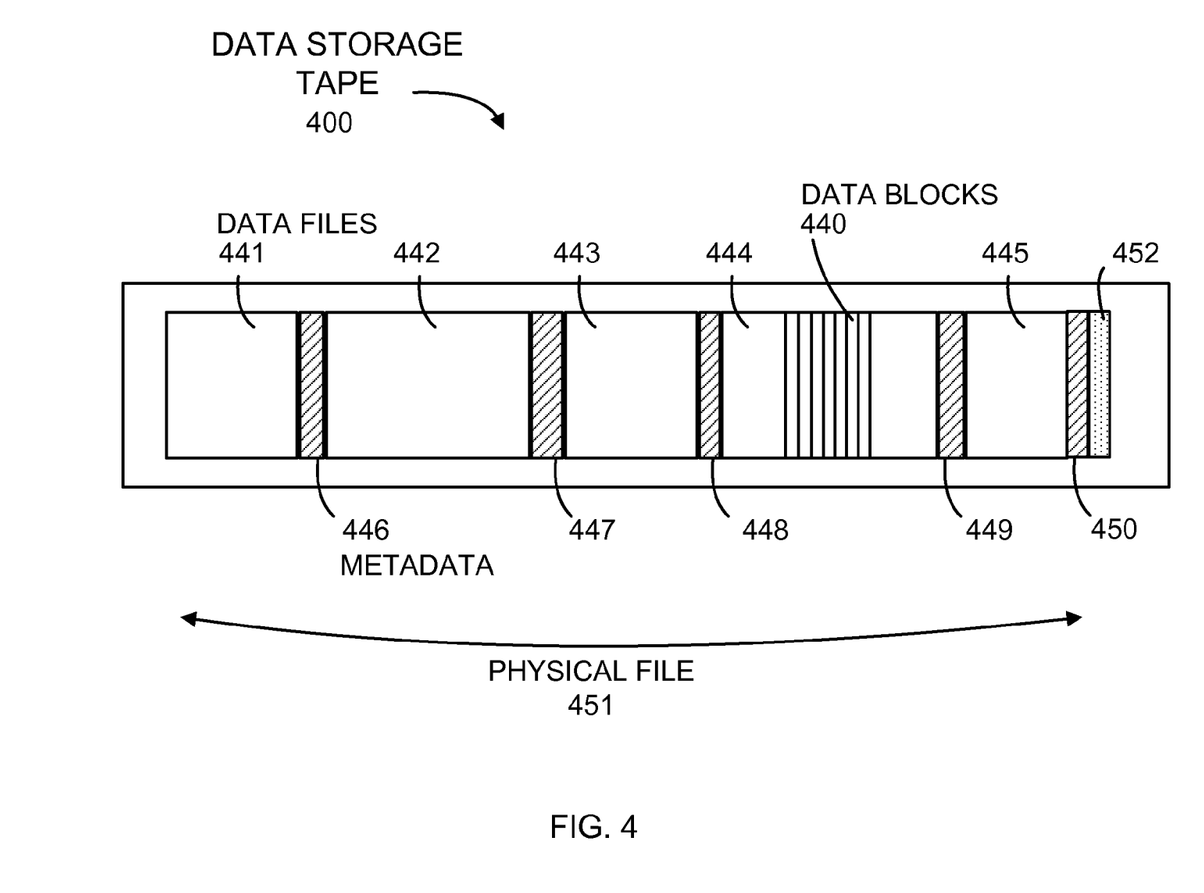
FIG. 4 is a block diagram showing the Single File Format which embodiments of the invention may be used to handle data synchronization events associated with storing data files.

To minimize the number of synchronizations, some applications embed multiple files in a single physical tape file. This is referred to as the Single File Format. FIG. 4 is a block diagram illustrating the Single File Format which embodiments of the invention may be used to handle synchronization events associated with storing data files. Multiple data files 441-445 may be stored on a tape medium 400 as a single physical file 451. Metadata 446-450 may be stored at the end of each of the data files 441-445 as shown. The application 202 uses the metadata 446-450 to keep track of the files 441-445 and their position on the tape 400. At the end of the collection of data files 441-445 is a tape mark 452. Each data file 441-445 may comprise data blocks 440.

In the event of a synchronize failure, some of the data in the device cache 211 may have actually been successfully written to the tape medium. If the application could determine which files did not get written, it could target a recovery point to the first compromised file rather re-writing all of the files.

Applications that use Single File Format typically maintain a Control Data Set (CDS) and have an audit function to validate the CDS against what is actually on the tape medium. However, with a large number of embedded files, this audit function can take many hours to complete.

One reliable recovery for the Single File Format applications in the event of a synchronization failure is to rewrite the entire set of files from the beginning. This means potentially rewriting thousands of files that might already have been safely written to the medium. Such rewriting all of the data degrades system performance.

Embodiments of the invention provide an efficient system service for efficiently handling of data synchronization events in a tape storage system. This system service may be invoked by an application to control synchronization events, determine the specific compromised files in the event of a synchronization failure, and assist with data file auditing such as Fast Audit operations for Single file Format applications.

Figure 5:
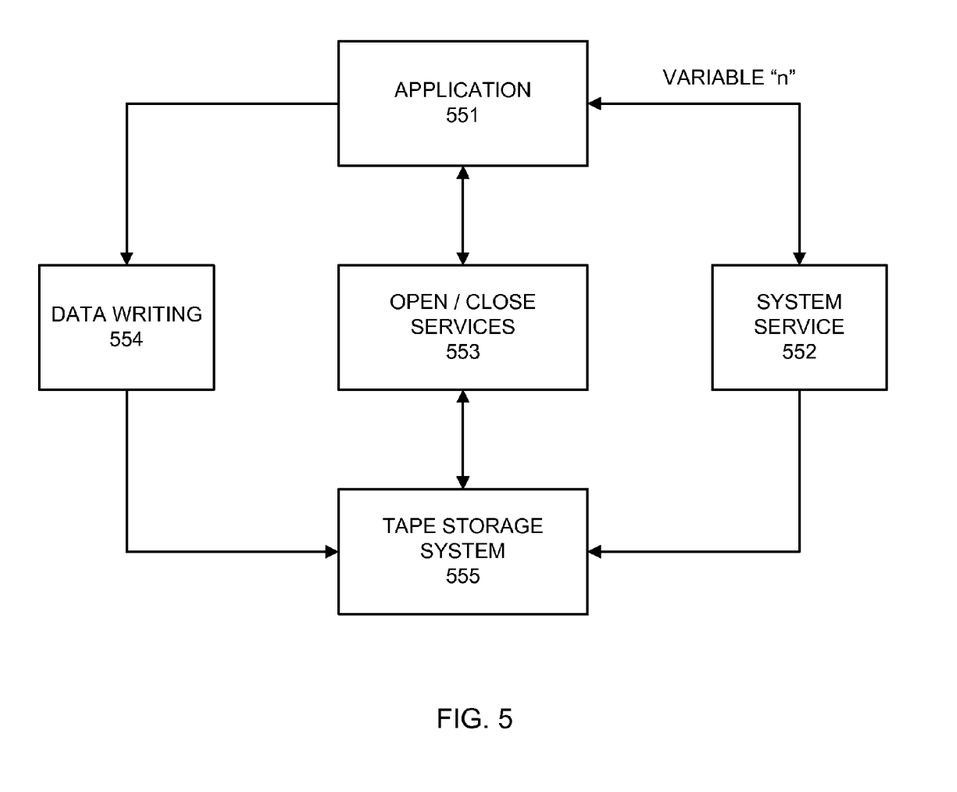
FIG. 5 is a flow diagram showing an example embodiment of a system service invoked by an application for data synchronization in a tape storage system.

FIG. 5 is a flow diagram showing an example embodiment of a system service invoked by an application for data synchronization in a tape storage system. Application 511 may invoke system service 552 to synchronize data files written to a tape medium in tape storage system 555. The writing of data to the storage medium may be performed by data writing service 554. Open/close services 553 are responsible for writing information preceding and following the actual data to be written and handling tasks preceding and following the writing of data to tape, respectively.

In one embodiment in which data files are not in the Single File Format, the application 511 may invoke the system service 552 once and specify a variable n that indicates the number of files that should be written before a synchronization occurs. The system service 552 keeps track of each file, as well as the number of blocks within each file, on a file boundary basis. In one embodiment, a file boundary comprises one or more tape marks.

In another embodiment, where the data files are in the Single File Format, the application 511 may invoke the system service 522 at the beginning and the end of every data file. The system service 522 keeps track of how many files have been written to tape at any one time.

All data, including tape marks, may be buffered in the device cache. After n files have been written to cache, a single explicit synchronize will be done in order to move the files from the cache to the tape medium. In the event of a synchronize failure, the system service 552 will report the file sequence number of the first file that did not get written to the medium, as shown by the arrow from the system service 552 to the application 551. From this information, the application 551 could determine the files that have been successfully written to tape and those that have not been written when the failure occurred.

In the case of a Single File Format, the application 551 calls the system service 552 at the end of each embedded file. This will allow the system service 552 to keep track of each embedded file within a Single File Format physical file 451. An explicit synchronize will automatically be issued based on a file sequence number that was specified by the application 551. In the event of a synchronize failure, the system will report the file sequence number associated with the first file that did not get written to the medium.

The system service 552 can also be directed to write all the file tracking data to DASD. This DASD file maps the individual files in the single physical file and can be used in an Fast Audit Function to validate the application's CDS.

The subject matter described above is provided by way of illustration only and should not be construed as limiting. Various modifications and substitutions of the described components and operations can be made by those skilled in the art without departing from the spirit and scope of the present invention defined in the following claims, the scope of which is to be accorded the broadest interpretation so as to encompass such modifications and equivalent structures. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, a "memory stick", optical media, magneto-optical media, CD-ROM, etc.

As will be appreciated by one skilled in the art, aspects of the present invention may be embodied as a method, system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "component" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN), Ethernet, SCSI, iSCSI, Fibre Channel, Fibre Channel over Ethernet, and Infiniband, or the connection may be made to an external computer, for example, through the Internet using an Internet Service Provider.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
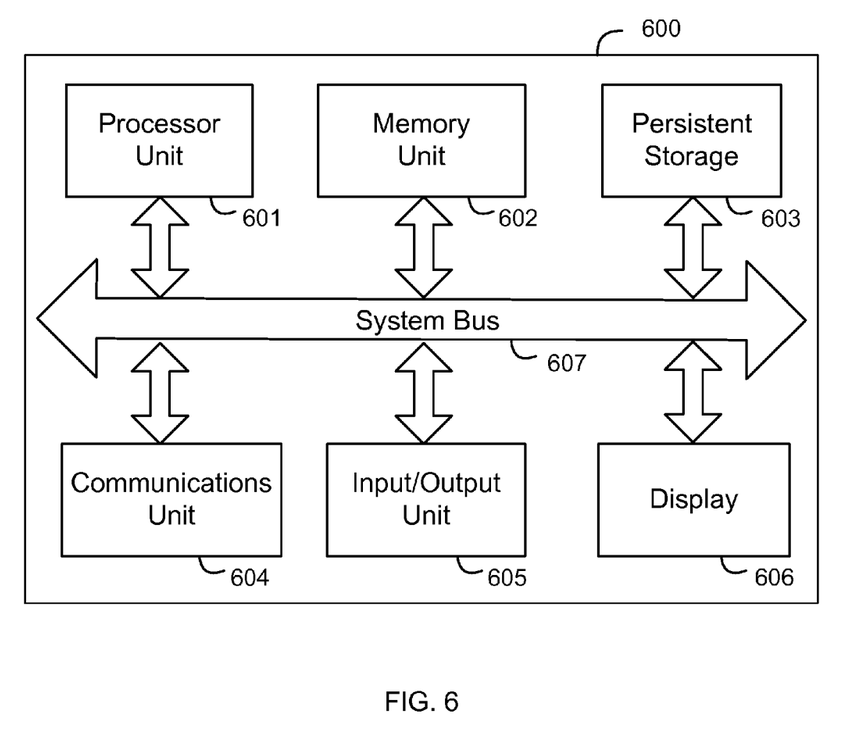
FIG. 6 is a block diagram of an example computer system which may be used to implement the components and functions in the exemplary embodiments of the invention.

FIG. 6 illustrates an exemplary block diagram of a representative computer 600 which may be used to implement the components and operations described with reference to FIGS. 1-5. Computer system 600 may include a processor unit 601, a memory unit 602, a persistent storage 603, a communications unit 604, an input/output unit 605, a display 606 and a system bus 607. Computer programs are typically stored in persistent storage 603 until they are needed for execution by an operating system, at which time the programs are brought into the memory unit 602 so that they can be directly accessed by the processor unit 601.

The processor unit 601 selects a part of memory unit 602 to read and/or write by using an address that the processor 601 gives to memory 602 along with a request to read and/or write. Usually, the reading and interpretation of an encoded instruction at an address causes the processor 601 to fetch a subsequent instruction, either at a subsequent address or some other address. The processor unit 601, memory unit 602, persistent storage 603, communications unit 604, input/output unit 605, and display 606 interface with each other through the system bus 607.

The flowchart and block diagrams in the figures described above illustrate the architecture, functionality, and operation of possible implementations of systems, methods and computer program products according to various embodiments of the present invention. In this regard, each block in the flowchart or block diagrams may represent a component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for writing data to a tape data storage medium, comprising:
   providing a system service and an application, wherein the application invokes the system service to handle data synchronization events associated with writing a group of files to the tape medium;
   keeping track of the files and data blocks in each file while writing the files to the tape medium based on information of file boundaries of the files being written; and
   responsive to a data writing failure, invoking by the application the system service to determine the files affected by the data writing failure.

2. The method of claim 1, wherein the system service comprises a variable indicating the number of files to be written before a data synchronization of the group of files to the tape medium.

3. The method of claim 1, wherein the file boundaries are tape marks.

4. The method of claim 1, wherein the data to be written to the tape medium are stored in a cache memory of a storage device.

5. The method of claim 4, further comprising:
   executing a data synchronization in response to a specified number of files being written to the cache memory; and transferring the files in the cache memory to the tape medium.

6. The method of claim 1, further comprising reporting a file sequence number identifying the first file that has not been written to the tape medium when the failure occurred.

7. The method of claim 1, wherein the data are in a Single File Format and the application invokes the system service at the end of each of the files.

8. The method of claim 7, further comprising keeping track of said each of the files within the Single File Format physical file.

9. The method of claim 8, wherein the system service writes file tracking data to a Direct Access Storage Device (DASD) file.

10. The method of claim 9, wherein the DASD file maps individual files in the Single File Format physical file to identify which of the files did not get written to the tape medium in case of failure.

11. The method of claim 9, wherein the DASD file is used in a Fast Audit function to validate a Control Data Set associated with the application.

12. A data tape storage system, comprising:
a processor;
at least one tape drive for recording data on a tape medium;
an application executed in the data tape storage system;
a system service executed by the processor and invoked by the application to perform operations, the operations comprising:
handling data synchronization events associated with writing a group of files to the tape medium;
keeping track of the files and data blocks in each file while writing the files to the tape medium based on information of file boundaries of the files being written; and
responsive to a data writing failure, invoking by the application the system service to determine the files affected by the data writing failure.

13. The system of claim 12, wherein the data to be written to the tape medium are stored in a cache memory of the storage system.

14. The system of claim 13, wherein the system service:
executes a data synchronization in response to a specified number of files being written to the cache memory; and
transfers the files in the cache memory to the tape medium.

15. The system of claim 12, wherein the system service reports a file sequence number identifying the first file that has not been written to the tape medium when the failure occurred.

16. A computer-program product for writing data to a tape data storage medium, the product comprising a non-transitory storage medium readable by a computer and embodying program instructions executable by the computer to:
provide a system service and an application, wherein the application invokes the system service to handle data synchronization events associated with writing a group of files to the tape medium;
keep track of the files and data blocks in each file while writing the files to the tape medium based on information of file boundaries of the files being written; and
responsive to a data writing failure, invoke by the application the system service to determine the files affected by the data writing failure.

17. The computer-program product of claim 16, wherein the data are in a Single File Format and the application invokes the system service at the end of each of the files.

18. The computer-program product of claim 16, further comprising program instructions executable by the computer to keep track of each of the files within a Single File Format physical file.

19. The computer-program product of claim 16, wherein the system service writes file tracking data to a Direct Access Storage Device (DASD) file.

20. The computer-program product of claim 19, wherein the DASD file maps individual files in the Single File Format physical file to identify which the files did not get written to the tape medium in case of failure.

* * * * *